UNITED STATES PATENT OFFICE.

HAROLD T. G. VAN DER LINDE, OF NEW YORK, N. Y.

RECOVERY OF RUBBER.

979,902. Specification of Letters Patent. Patented Dec. 27, 1910.

No Drawing. Application filed January 8, 1910. Serial No. 536,980.

*To all whom it may concern:*

Be it known that I, HAROLD T. G. VAN DER LINDE, a subject of the King of Great Britain, residing in the borough of Manhattan, city, county, and State of New York, have invented certain new and useful Improvements in Recovery of Rubber; and I do hereby declare the following to be a full, clear, and exact description of the invention, such as will enable others skilled in the art to which it appertains to make and use the same.

My invention relates to certain new and useful improvements in method of separating particles of rubber from substances with which they are associated.

In its broader aspect, as will hereinafter appear, the invention is applicable generally to the separation of particles of rubber, whether vulcanized or unvulcanized, from the remaining ingredients of mixtures in which they are present. The invention is of special service, however, in the recovery of rubber from trees, plants, shrubs, roots, vines or the like, wherein the rubber is contained in the texture of the vegetable source, or as a coagulable latex, as, for instance, in the guayule shrub which grows in arid regions in northern Mexico and southern Texas, and which has necessitated, for various reasons, a special treatment for the economical extraction of its rubber contents.

In the guayule shrub, the rubber present is accompanied by about one-fourth or more of its weight of a resinous matter containing oxygen, and the associated rubber and resin lie mainly in the outside structures of the shrub (chiefly in the bark), probably serving to prevent undue evaporation of the scanty juices of the plant during the prolonged dry seasons. The shrub is now almost invariably treated as follows: It is first finely divided by crushers or cutters, and the resulting "crumb" is placed in a pebble mill. The pebbles and the finely divided shrub are then covered with water; the door of the mill is closed, and the pebble mill is rotated, so that the falling and rolling pebbles will squeeze and rub the crumb in the body of the water below its surface. This action not only disintegrates the corky and woody parts of the plant, dividing them into smaller and smaller fragments, but the action on the rubber is of an opposite character, due to the property of welding or "regelation" that is a characteristic of this substance. By reason of this property, whenever the pebbles press two or more particles of rubber together, they coalesce completely, forming a larger particle, and as soon as the portion of the shrub containing said particles is relieved of the pressure of the pebbles, each of these rubber particles will almost, if not entirely, separate itself from the rest of the material, and by reason of its specific gravity being less than that of water, will rise to the surface of the water, while the part from which the rubber was separated, will sink. Under favorable conditions, the rubber is thus built up into large number of small "worms", which rise to the surface of the water, and when this stage is reached, the mill is stopped, the door opened, and the contents, less the pebbles, is emptied into swimming or flotation tanks. Here, in water, by gravitation, most of the rubber floats, and most of the woody and barky matter (containing much of the resin) sinks. The water in the pebble mill also serves to keep down the temperature below the softening temperature of the resins.

The material which sinks in the flotation tanks is known in the art as "sinkers" or "rubber bagasse." Even in the most up-to-date factories about one-twelfth to one-eighth of the rubber often remains entangled with the sinkers or bagasse, according to the condition of the shrub, and heretofore has been commercially unrecoverable. The rubber particles thus entangled in the bagasse are in small pieces which adhere to the particles of wood, either through the natural adhesiveness of the rubber itself, or by the joint effect of this adhesiveness with the extreme stickiness of the resin in the wood; or, sometimes the woody fiber is driven into or through the particles of rubber, and sometimes the rubber adheres to small particles of foreign matter, such as sand. The usual method of disposing of this rubber bagasse is to burn it as fuel under the boilers in the plant, but, because of the presence of the particles of rubber therein, it is an expensive fuel and to burn it means a great loss to the manufacturer.

For the recovery of particles of rubber thus entangled in the sinkers or rubber bagasse, it is to be borne in mind that the two bodies which we desire to separate, in this instance, are: (1) Rubber (plus resin), slightly lighter than water, with comparatively slight buoyancy therein; (2) hard woody and barky matter (plus resin), most of which will not float, if freed from air bubbles, even in a liquid having a specific gravity of 1.2, or even in a saturated solution of common salt.

Although, in special cases, I may employ a liquid of greater specific gravity than water, and even a saturated solution of common salt, I prefer to use natural water, of the usual specific gravity, as the best and most easily available liquid in which to conduct the separation, for the reason that the woody and barky matter already possesses a specific gravity sufficiently differentiated from that of water for all practical purposes and because (unlike a saturated solution of common salt, for example), it leaves no residue prejudicial to the value of the residue as a fuel after the rubber particles have been eliminated. I may also, in various ways, make the woody and barky particles heavier, but for most purposes, ordinary water-logging will be all that will be attempted in this regard. Primarily, therefore, my invention is directed toward decreasing the specific gravity of the rubber particles, thereby making them lighter and thus increasing their buoyancy in the separating fluid, so that, when the mass is subjected to the action of a separating liquid of suitable specific gravity, such as water, the difference in the specific gravity between the buoyant rubber particles and the remaining ingredients of the mixture will be so far increased that a ready separation will take place, the completeness of the separation being, in some instances, enhanced by stirring the mass. In order to thus decrease the specific gravity of the particles of rubber and therefore increase their buoyancy or lightness, I subject the mass to the action of an intumescent, that is, an agent which will swell the rubber particles so as to decrease their weight per unit of bulk. This may be effected either through the agency of any suitable solvent, acting upon the rubber particles under suitable conditions, or through the agency of a gas or liquid adapted to be occluded in the rubber.

The conditions of use of the intumescent, in order to have the effect contemplated by my invention, will require that its employment shall be limited to the first stage of the swelling action, i. e., to that stage wherein the intumescent, upon coming into contact with the rubber particles, causes them to swell considerably without, however, going over into the liquid condition of full solution. This condition is commonly recognized as a stage in the action of solvents on vegetable and animal colloids in general.

Rubber is very easily swelled by bringing it into contact with a great many substances of an intumescent character. The rubber first swells greatly, as the intumescent diffuses through the mass, and if the intumescent be also a solvent it may slowly approach the liquid state, as more of the solvent is added, until, at last, with sufficient time and stirring, the rubber enters into a state of pseudo-solution, the exact nature of which has not been fully determined. In order to enable these intumescents to diffuse through the substance of the rubber to the best advantage they should be, in most instances, in the liquid, vaporous or gaseous state at the temperature at which the operation takes place. In fact, in order not to break down the very unstable and highly polymerized rubber molecule, the operation should be conducted at, or nearly at, the ordinary temperature of the atmosphere (somewhere between, say, 60° F. and 100° F. preferably), although these limits may be extended.

Among the solids, liquids and gases that may be used as the intumescent or swelling agent for the rubber particles, I may enumerate the following:

1. All the volatile and liquid substances of the paraffin series, from marsh gas to the heavy lubricating oils, with many of their compounds and derivatives. I prefer to use this class of substances, in most instances, and more particularly one of the species thereof, i. e., the petroleum distillates, as will hereinafter more fully appear.

2. The olefines, their compounds and derivatives.

3. Benzene ($C_6H_6$) and its homologues.

4. Phenol, its homologues, compounds and derivatives.

5. Essential oils in general.

6. Fixed fatty oils.

7. The higher fatty acids.

8. Some alcohols, ethers, compound esters, aldehydes, ketones, etc.

9. "Turpentine", "resin spirit", "resin oil", etc., including their compounds and derivatives.

10. Chloroform and similar (analogous) bodies.

11. Carbon disulfid, carbon tetrachlorid.

12. Carbon dioxid, coal gas and other illuminating gas, carbon monoxid or hydrogen, because when occluded into rubber they lower its specific gravity by swelling it (No. 12 is obviously overlapped in part by Nos. 1 and 2).

13. Anilin and some analogous bodies, their compounds and derivatives.

14. Heavy or "dead" oil of the gas works.

15. Light gas tar or petroleum tars and similar bodies.

16. Isoprene and many such bodies of the composition of $C_5H_8$, $C_{10}H_{16}$, and their polymers.

17. Creosote, and many other volatile and non-volatile products.

I have heretofore referred to the fact that the rubber bagasse contains, mainly in the woody and barky matter, besides the rubber, a further large quantity of "resin," this designation being herein employed to include a mixture of several acetone-soluble substances, besides minor fractions of undetermined composition. It is, therefore, desirable that the intumescent employed should be a better solvent for rubber than for resin. It is also desirable that any solvent intumescent employed should nevertheless have a sufficient action upon the resin to soften it up slightly, so that, after the swollen rubber particles have been separated in the flotation tank, the softened resin will act to better advantage, as a binder, in briqueting the residue of woody and barky matter, for fuel purposes. I have found by experimentation that an intumescent uniting these desirable characteristics is petroleum-distillate, as, for instance, any of the fractions ranging from kerosene to a spirit of 72° Bé., or even lighter. The most suitable petroleum-distillate fractions have the additional advantage that they are cheap, tolerably constant, easily obtained in sufficient quantities, volatile and of low specific gravity, and readily driven off by a heat not higher than that of boiling water. When a mixture of bagasse with water is subjected to vigorous agitation with a suitable quantity of one of these bodies, the rubber very rapidly absorbs a large part of the spirit, swells up, and comes to the top if the vessel be allowed to stand. When the agitation applied is sufficient, the rubber thus floating is found to be practically all that the bagasse contained. In practice, it is preferable to employ a kind of agitation that will both mix the intumescent into and simultaneously disintegrate the bagasse, and to this end, the usual pebble mill may be employed with satisfactory results. The water used in the pebble mill subserves the usual functions of a lubricant and a cooling agent to keep down the temperature of the bagasse during the tumbling operation, and, while the amount of water used should be sufficient for these purposes, it should not be employed in materially larger quantity, for the reason that its presence naturally slows down the action by preventing free contact of the petroleum spirit and the rubber.

In practice, I have obtained satisfactory results by first dewatering the rubber bagasse until it has a consistency resembling that of wet saw-dust or tea leaves that are sprinkled on a floor before sweeping. I then place the dewatered bagasse in a revolving drum, sometimes, but not necessarily, adding pebbles or balls, to make up the usual pebble mill charge. A measured quantity of intumescent (say 62° Bé. naphtha) equal to about three-quarters of a U. S. gallon, to one hundred pounds of the dry bagasse (i. e., of the bagasse minus its moisture) is added, and the door of the drum is closed. The drum is then rotated, continuously or at intervals, until the desired swelling effect has been attained, which with an atmosphere at about 80° F., and a barometric pressure of between 550 mm. and 650 mm. takes about from one to four hours, according to the character of the charge and the proportions thereof. The door is then opened and the thoroughly mixed and disintegrated mass, minus the balls or pebbles, is then thrown into a flotation tank containing cold water, and vigorously stirred. On standing for a short time, nearly all the rubber, with only a small quantity of woody fiber, is found floating on the surface. This is skimmed off and the small amount of fiber which comes with it is separated by well-known methods. The solvent, of course, may be recovered, by simple means, from both the "floaters" and "sinkers."

By means of my invention, therefore, the particles of rubber contained in the rubber bagasse of the ordinary method of rubber extraction from the guayule shrub and the like are recoverable economically, for which reason the invention is applicable to the treatment of a material which has hitherto been rated as a waste product except for fuel purposes. Furthermore, the softening up of the resin, incident to the operation, causes the particles of the sinkers, after the water has been run off from the flotation tank, to be quite adhesive, so that they can be briqueted without a binder, or with a very small proportion of a binder, in which condition the briquets are in good mechanical shape for firing, and can be piled and allowed to dry, which is impossible with the flocculent bagasse itself. I have further ascertained and demonstrated that the intumescent can be employed at an earlier stage of the treatment of the shrub, to-wit, when the original crushed shrub is being subjected to the squeezing and rubbing action of the pebble mill. By treating the shrub with the petroleum distillate (say 62° Bé. naphtha) or other intumescent, during this stage of the operation, it is found entirely practicable to extract substantially all of the rubber; that is, upon discharging the squeezed and rubber "crumb" from the pebble mill into the flotation tank and vigorously agitating it therein for a few minutes, substantially all of the particles of rubber will rise to the surface, together with a small quantity of the woody fiber, and the main body portion of the woody fiber and barky matter will sink to the bottom of the flotation tank in the form of bagasse containing but a negligible quantity of rubber, and adapted, by reason of the softening up of its resin, to be briqueted, as before. This innovation in the method of extracting rubber directly from the original crushed shrub has a number of advantages over extracting it from the rubber bagasse. Thus, it requires but one handling instead of two, and permits a corresponding saving in apparatus (especially tankage apparatus) and the floor space therefor. In comparison with the usual pebble mill treatment, wherein an intumescent is not employed, it has additional and striking advantages. For instance, in the treatment of the original crushed shrub in the pebble mill, it is found that the amount of shrub charged in the mill may be considerably increased, while, at the same time, the duration of the tumbling operation is reduced by one-half. Furthermore, it is only necessary to employ about one-twelfth, by weigth, of the pebbles used in the old method, i. e., 334 pounds, instead of 4,000 pounds, and the amount of liquid employed in the pebble mill is reduced from about 1,250 pounds to about 400 pounds. Inasmuch as the power required for operating the mill is about one-fourth of that needed by the old method, the total energy required for operating the mill is but one-eighth of the usual practice. In addition to this, there is a considerable saving in water and pumping—the ordinary method requiring about 400 pounds or more of water for every pound of dry rubber shipped, whereas this is cut down in the new method to probably one-tenth of that amount. Finally, the saving in plant and tankage is further supplemented by the production of a good, dry, easily handled fuel, instead of a fluffy and inefficient fuel containing usually about fifty per cent. of water.

I have hereinbefore indicated that, in its broader aspect, the invention is applicable generally to the separation of particles of rubber, whether vulcanized or unvulcanized, from the remaining ingredients of mixtures in which they are present. One instance of this broader use is in the application of the invention to the reclaiming of rubber from old rubber shoes, old rubber belting, hose, automobile tires, and the like, all of which contain a large proportion of cotton or other similar fabric. This old waste rubber material, which forms a common market staple, is sorted and ground up into a more or less fine crumb, which is then treated with hot dilute sulfuric acid, to destroy the fiber, which is useless for manufacturing purposes. The end-products of such reactions are well known, most of them being soluble bodies which are easily washed out. A very large proportion of the cellulose is, however, only partially acted on, leaving a large mass of oxycelluloses and similar bodies, which are insoluble. As these bodies are usually somewhat slimy, and as the difference between their specific gravities and that of the rubber portion of the mass is small, it has hitherto been found difficult to separate them cheaply and efficiently.

For the separation of the rubber particles from their admixture with the oxycelluloses and like constituents, the mixture, in a wet or moist condition, similar to that of the rubber bagasse, may be tumbled and disintegrated in a pebble mill in the presence of a suitable intumescent, as, for instance, naphtha or other like petroleum-distillate, and the swollen rubber particles are then recovered by flotation in water, or in some liquid of higher specific gravity than water, in a flotation tank, the oxycelluloses settling to the bottom of the tank as sinkers.

In connection with the foregoing description, it will be noted that in the treatment of the original milled shrubs, I have had satisfactory results in employing from six to ten per cent. by weight of naphtha as the swelling agent. For the treatment of the reclaimed rubber, even a lesser amount (say 4% by weight) will suffice. It is evident, however, that these quantities may be varied in individual instances according to the particular condition of the material treated, which is always subject to more or less variation.

What I claim is:

1. In the art of separating particles of rubber from mixtures in which they are contained, the method of increasing the buoyancy of the rubber particles, for the purpose described, by subjecting them to the action of a specific-gravity lowering intumescent; substantially as described.

2. In the art of separating particles of rubber from mixtures in which they are contained, the method of increasing the buoyancy of the rubber particles, for the purpose described, by subjecting them to the swelling action of a specific-gravity lowering solvent; substantially as described.

3. In the art of separating particles of rubber from mixtures in which they are contained, the method of increasing the buoyancy of the rubber particles, for the purpose described, by subjecting them to the action of a substance of the paraffin series, substantially as described.

4. In the art of separating particles of rubber from mixtures in which they are contained, the method of increasing the buoyancy of the rubber particles, for the purpose described, by subjecting them to agitation in the presence of a specific-gravity lowering intumescent; substantially as described.

5. In the art of separating particles of rubber from mixtures in which they are contained, the method of increasing the buoyancy of the rubber particles, for the purpose described, by subjecting them to agitation in the presence of water and a specific-gravity lowering intumescent; substantially as described.

6. In the art of separating particles of rubber from mixtures in which they are contained, the method of increasing the buoyancy of the rubber particles, for the purpose described, by subjecting them to the action of a specific-gravity lowering intumescent and simultaneously subjecting the mixture to a squeezing and rubbing action in the presence of water; substantially as described.

7. In the art of separating particles of rubber from mixtures which also contain resin, the method of increasing the buoyancy of the rubber particles without materially increasing the buoyancy of the resin, which consists in subjecting the mixture to the action of a substance which has a greater swelling effect upon rubber than upon resin; substantially as described.

8. In the art of separating particles of rubber from mixtures which also contain resin, the method of increasing the buoyancy of the rubber particles without materially increasing the buoyancy of the resin, which consists in subjecting the mixture to the action of a substance which has a greater swelling and specific-gravity lowering effect upon rubber particles than upon resin, but which is a sufficient solvent of resin to soften up the resin and enable it to act as a binder in briqueting the mass after the separation of the swollen particles of rubber; substantially as described.

9. In the art of separating particles of rubber from a mixture containing them, the method of increasing the buoyancy of the rubber particles, which consists in swelling the rubber particles by subjecting them to the swelling action of a petroleum distillate; substantially as described.

10. In the art of separating particles of rubber from a mixture containing them, the method of increasing the buoyancy of the rubber particles, which consists in swelling the rubber particles by subjecting them to the swelling action of a petroleum distillate in the form of vapor; substantially as described.

11. In the art of separating particles of rubber from mixtures in which they are contained, the method of decreasing the specific-gravity of the rubber particles and effecting their subsequent separation, which consists in subjecting them to the action of a specific-gravity lowering intumescent, thereby increasing their buoyancy, and subjecting the mass to the separating action of a liquid while the rubber particles are still in the condition of increased buoyancy; substantially as described.

12. In the art of separating particles of rubber from a mixture containing them, the method of increasing the buoyancy of the rubber particles and effecting their subsequent separation, which consists in subjecting them to the swelling action of a specific-gravity lowering solvent, and then subjecting the mixture containing the swollen particles of rubber to gravity separation in a liquid; substantially as described.

13. In the art of separating particles of rubber from a mixture containing them, the method of increasing the buoyancy of the rubber particles and effecting their subsequent separation, which consists in subjecting them to the swelling action of a specific-gravity lowering intumescent, and then separating out the swollen rubber particles by subjecting the mass to agitation in the presence of a separating liquid; substantially as described.

14. In the art of separating particles of rubber from a mixture containing them, the method of increasing the buoyancy of the rubber particles and effecting their subsequent separation, which consists in subjecting them to the swelling and specific-gravity lowering action of a solvent, and then separating out the swollen rubber particles by subjecting the mass to agitation in the presence of a separating liquid; substantially as described.

15. In the art of separating particles of rubber from mixtures in which they are contained, the method of increasing the buoyancy of the rubber particles and of effecting their subsequent separation, which consists in subjecting the rubber particles to the swelling action of a specific-gravity lowering intumescent, water-logging the other ingredients of the mixture, and subjecting the mixture of swollen rubber particles and water-logged particles to the separating action of a liquid; substantially as described.

16. In the art of separating particles of rubber from mixtures in which they are contained, the method of increasing the buoyancy of the rubber particles and of effecting their subsequent separation, which consists in subjecting the rubber particles to the swelling action of a specific-gravity lowering solvent, water-logging the other ingredients of the mixture, and subjecting the mixture of swollen rubber particles and water-logged particles to the separating action of a liquid; substantially as described.

17. In the art of separating particles of rubber from mixtures in which they are contained, the method of increasing the buoyancy of the rubber particles and of effecting their subsequent separation, which consists in subjecting the rubber particles to the action of a specific-gravity lowering intumescent, and then subjecting the mixture to the separating action of a liquid containing a suitable soluble material to increase its specific gravity; substantially as described.

18. In the art of separating particles of rubber from mixtures in which they are contained, the method of increasing the buoyancy of the rubber particles and of effecting their subsequent separation, which consists in subjecting the rubber particles to the action of a specific-gravity lowering intumescent, water-logging the other ingredients of the mixture, and subjecting the mixture of swollen rubber particles and water-logged particles to the separating action of a liquid containing a suitable soluble material to increase its specific gravity; substantially as described.

19. In the art of separating particles of rubber from mixtures in which they are contained, the method of increasing the buoyancy of the rubber particles and of effecting their separation, which consists in subjecting them to the swelling action of a specific-gravity lowering intumescent at a relatively low temperature (say from 60° to 100° F.), and then subjecting the mass to gravity separation in a liquid; substantially as described.

20. The method of separating particles of rubber from the guayule and other rubber bearing plants, which consists in subjecting the plant when in a finely divided condition, to the action of a substance having a swelling and specific-gravity lowering effect upon the rubber particles, and then effecting the separation of the swollen rubber particles by flotation; substantially as described.

21. The method of separating particles of rubber from the guayule shrub and other rubber-bearing plants, which consists in subjecting the plant when in a finely divided condition, to attrition in the presence of a substance having a swelling and specific-gravity lowering effect upon the rubber particles, and then effecting the separation of the swollen particles of rubber by flotation; substantially as described.

22. The method of separating particles of rubber from the guayule and other rubber-bearing plants, which consists in subjecting the plant when in a finely divided condition, to agitation in a body of water and in the presence of a substance having a swelling and specific-gravity lowering effect upon the rubber particles, and then effecting the separation of the swollen particles of rubber by flotation; substantially as described.

23. The method of separating particles of rubber from the guayule shrub and other rubber-bearing plants, which consists in subjecting the plant when in a finely divided condition, to attrition in a body of water and in the presence of a substance having a swelling and specific gravity lowering effect upon the rubber particles, and then effecting the separation of the swollen particles of rubber by flotation; substantially as described.

24. The method of separating particles of rubber from the guayule shrub and other rubber-bearing plants, which consists in subjecting the plant when in a finely divided condition, to attrition in a body of water and to gravity separation of the same, then subjecting the lighter particles to a substance having a swelling and specific-gravity lowering effect upon the rubber particles, and then effecting the separation of the swollen particles of rubber by flotation; substantially as described.

25. The method of separating particles of rubber from the guayule and other rubber bearing plants, which consists in subjecting the plant when in a finely divided condition, to the action of a petroleum distillate until the particles of rubber are swollen, and then effecting the separation of the swollen particles of rubber by flotation; substantially as described.

26. The method of separating particles of rubber from the guayule and other rubber-bearing plants, which consists in subjecting the plant when in a finely divided condition, to attrition in the presence of a petroleum distillate until the particles of rubber are swollen, and then effecting the separation of the swollen particles of rubber by flotation; substantially as described.

27. The method of separating particles of rubber from particles of wood, bark and resin, with which they are associated in the comminuted guayule plant, the bagasse thereof, and the like, which consists in subjecting the mixture to the action of a substance which has a greater buoyant effect upon rubber than upon resin, but which is a sufficient solvent of resin to soften the resin, effecting the separation of the swollen rubber particles by flotation, and briqueting the mass after the separation of the swollen particles of rubber; substantially as described.

In testimony whereof I affix my signature, in presence of two witnesses.

HAROLD T. G. VAN DER LINDE.

Witnesses:
J. A. WHITCOMB,
L. B. PENFIELD.